United States Patent [19]

Wohlwend

[11] 4,133,394

[45] Jan. 9, 1979

[54] PERCUSSION TOOL

[76] Inventor: Maurice Wohlwend, 5001 S. 112th St., Seattle, Wash. 98176

[21] Appl. No.: 828,313

[22] Filed: Aug. 29, 1977

[51] Int. Cl.[2] .......................... B25D 9/00; B23B 5/22

[52] U.S. Cl. .................................... 173/139; 279/19.7

[58] Field of Search ................ 173/139; 279/1 Q, 1 S, 279/19, 19.1-19.7

[56] References Cited

U.S. PATENT DOCUMENTS

| | | | |
|---|---|---|---|
| 975,905 | 11/1910 | Taylor | 279/19.7 X |
| 1,134,123 | 4/1915 | Greve | 173/139 X |
| 1,142,238 | 6/1915 | Cook | 173/139 |
| 1,795,306 | 3/1931 | Jimerson | 279/19.6 |
| 2,090,464 | 8/1937 | Allen | 279/19 |
| 2,440,150 | 4/1948 | Mitchell | 279/19.6 |
| 2,512,149 | 6/1950 | Gartin | 279/19.5 |
| 2,519,477 | 8/1950 | Kind | 173/139 X |
| 3,157,070 | 11/1964 | Heidrich | 173/139 X |
| 3,292,976 | 12/1966 | Leavell | 173/139 X |
| 3,994,504 | 11/1976 | Harrison | 279/19.6 |

*Primary Examiner*—Lawrence J. Staab
*Attorney, Agent, or Firm*—Graybeal, Barnard & Uhlir

[57] ABSTRACT

A power driven reciprocating hammer strikes a tool shaft or moil. A split ring of larger diameter than the moil extends about a reduced diameter shank portion of the moil and makes contact with a one-piece bushing, through which the moil extends, when the moil approaches its outward end of travel. The bushing is moved against a body of elastomeric material which is housed within a nose cap. Such material absorbs the remaining energy in the moil and in so doing changes its shape, including by flowing radially outwardly through an axial space provided between the nose cap and the nose end of the housing. Cross pins removably connect axially projecting mounting lug portions of the nose cap to the nose end of the housing.

12 Claims, 6 Drawing Figures

*Fig. 4*
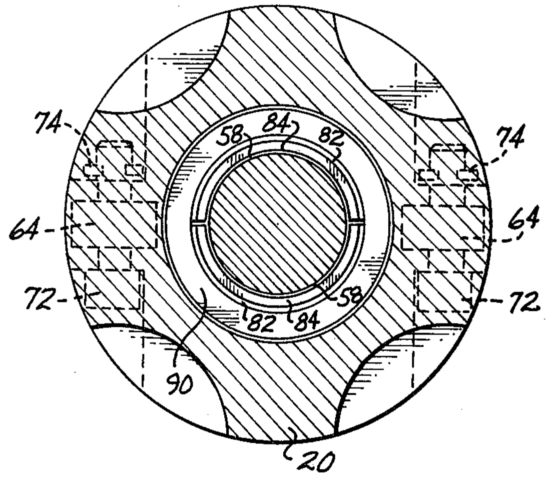
*Fig. 5*
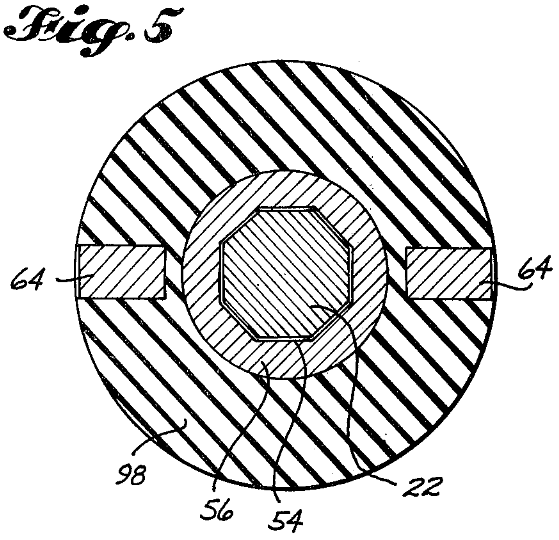
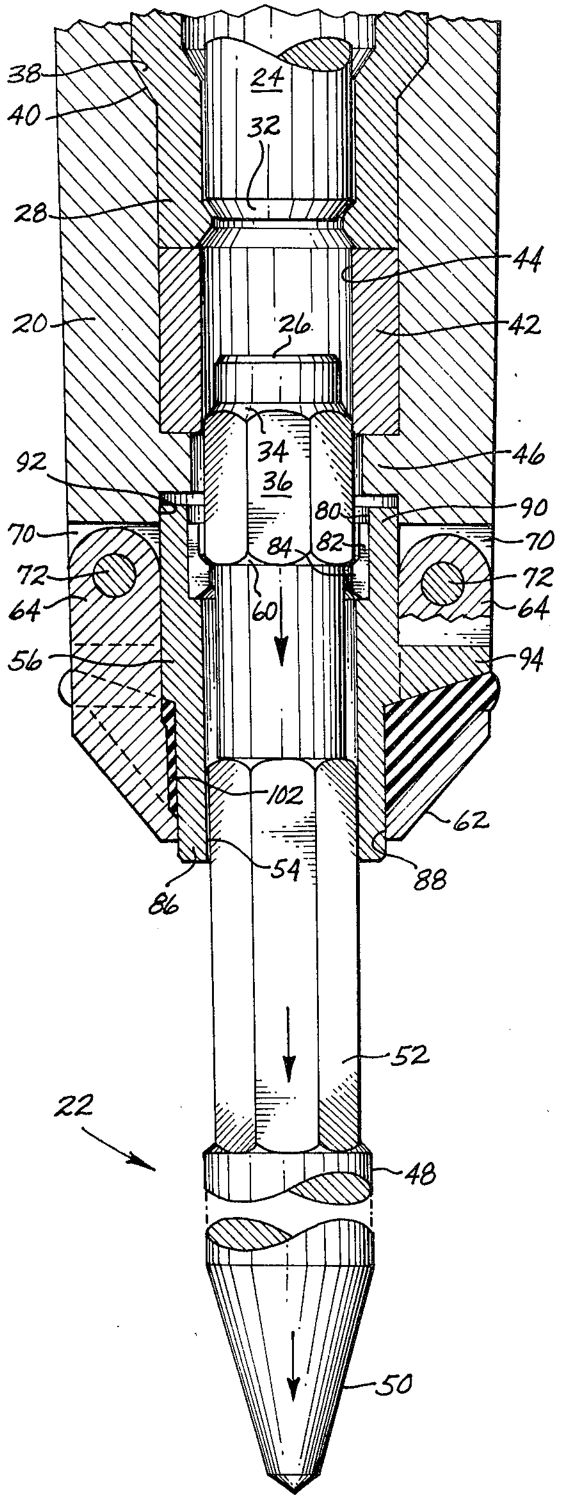
*Fig. 3*

PERCUSSION TOOL

BACKGROUND OF THE INVENTION

1. Field of the Invention

This invention relates to percussion tools, and more particularly to an improved manner of securing the tool shaft or moil and to an improved cushioned moil stop.

2. Description of the Prior Art

Percussion tools of the type generally similar to the improved percussion tool of the the present invention basically comprise a casing or housing from which a moil or tool shaft projects. A projecting knob or collar on the moil retains the moil within the casing. A reciprocating hammer within the casing drives the moil so that it reciprocates forcefully during use, causing the moil to break up or penetrate whatever work piece to which it is applied. An example of this type of percussion tool is disclosed by my U.S. Pat. No. 3,739,863, granted June 19, 1973. Another example is the common handheld jackhammer.

As disclosed in my aforementioned U.S. Pat. No. 3,739,863, the means driving the moil may be a gas spring driven piston or hammer which repeatedly strikes the top of the moil, causing the moil to be propelled forcefully downwardly. Between the blows of the piston or hammer, the weight of the percussion tool and the rebound of the moil from the work piece help to return the moil to its starting position.

Thus, it is seen that during the use the moil will move back and forth through a fairly constant range of travel. However, in certain instances, such as when the material being worked on suddenly breaks or moves away, or when the impact tool is inadvertently actuated while the moil is not in contact with the workpiece, the moil will exceed a predetermined range of travel and collide with an internal structure of the percussion tool. As can be appreciated, due to the substantial forces involved, repeated collisions between the knob or collar on the moil and the internal structure of the impact tool often result in such damage that the impact tool is rendered inoperable and in need of costly repair.

It is known to provide a moil with a recessed portion which defines a shoulder that collides with a transverse stop pin which the moil exceeds a predetermined range of travel during use. It can be appreciated that the resulting jarring metal-to-metal impact between the moil and the stop pin often shears the stop pin or results in a jammed moil due to mushrooming of the moil in the region of its impact with the stop pin.

Cushioned moil stops have also been deviced, such as that disclosed in U.S. Pat. No. 1,774,905 granted Sept. 2, 1930 to Smrdel, which include an elastic buffer. In the Smrdel moil stop, the elastic buffer is enclosed between the elongated nosecap of the impact tool and a split, flanged bushing which surrounds the moil. The upper end of the moil includes an outwardly projecting collar, of greater diameter than the shaft of the moil, which strikes the flange on the split bushing when the moil moves past a predetermined position, thereby compressing the buffer and stopping the moil.

The Smrdel moil stop suffers from a drawback in that its cylindrical lower casing, which encloses the elastic buffer, does not allow unlimited outward flow of the elastic buffer when it is compressed. This may result in less than optimum cushioning, if an insufficient flow space is provided for the compressed buffer. Such a construction may also result in rapid wear and early failure of the buffer since, when it is compressed, it may be forced inwardly against the moving flanged bushing which surrounds the moil. In addition, the long tubular form of buffer results in the possibility that the buffer may buckle when compressed, which would also force certain portions of it against the moving flanged bushing, again resulting in the possibility of rapid wear and early failure of the buffer.

The collared moil utilized in the Smrdel device also presents problems. It is apparent that, if the moil also has an enlarged or angularly disposed work tip such as that disclosed in U.S. Pat. No. 1,470,622 granted Oct. 16, 1923 to Jimmerson, in order to permit insertion or removal of such a moil through the nosecap, the aperture for the moil in the nosecap may have to be sized larger than the main shaft of the moil in order to permit passage of the collar on the moil. As can be appreciated, the extra space between the moil and the nosecap resulting from such an enlarged aperture leaves the lower portion of the flanged bushing, and thus the moil, with support which may be less than adequate and thus may subject it to unwanted sidewise displacement. In addition, the enlarged aperture may lead to early failure of the buffer if it is dragged down into said aperture by the flanged bushing which surrounds the moil, when the bushing is displaced downwardly by the moil. Similarly, such undesired entry of the buffer into said enlarged aperture may also occur when the buffer is subjected to compression by the flanged bushing, thereby squeezing it into said aperture. Finally, with such a construction, both the flanged bushing and the elastic buffer apparently have to be of a split construction in order to permit insertion or removal of the moil. Naturally, such split construction results in increased cost and makes assembly and disassembly of the device a cumbersome task.

In order to prevent these problems, it is possible that the enlarged or angularly disposed work tip be threadedly connected to the moil, but of course such a solution leads to its own problems in that the forces involved during operation of the impact tool may damage the threads or cause the work tip to be jammed onto the moil, thereby making it quite difficult to remove, as well as being expensive.

A further disadvantage of the Smrdel impact tool is that its nose bushing may be subject to early failure because of the wear caused by the relative movement of the longitudinally vibrating moil within it. Applicant theorizes that this rapid wear is due to the fact that, when the moil is displaced sideways into contact with the bushing, there is only a single line of contact between the cylindrical shaft on the moil and the larger, cylindrical bushing which surrounds it.

Another disadvantage of the prior art devices is that their nosecaps are usually secured to the main body of the impact tool by costly and complex spring arrangements, or by costly and damage prone threads or transverse bolts. Such constructions have the further disadvantage in that they may be cumbersome and awkward to assemble or disassemble with it is necessary to remove the nosecap in order to insert, remove or index the moil. In addition, such constructions may increase the overall diameter of the casing of the impact tool beyond what is strictly necessary.

BRIEF SUMMARY OF THE INVENTION

A basic object of the present invention is to provide an impact tool having an apparatus for bringing the moil to a cushioned stop, in order to prevent damage to the impact tool when the moil travels past a predetermined limit. To this end, in basic form, the improved impact tool of the present invention specifies a casing within which a powered hammer repeatedly strikes a protruding moil causing it to reciprocate forcefully during use. Arranged concentrically about the moil are a flanged nose bushing having an outwardly extending radial flange, a resilient moil cushion, and a nose cap. At least a portion of the periphery of the moil cushion is unbounded by both the nose cap and the flange on the nose bushing. The nose cap is mounted to the casing and has an aperture through which a portion of the nose bushing and the moil extend. As the moil travels past a predetermined point, the nose bushing is forced downwardly, compressing the moil cushion and forcing it to flow radially outwardly while bringing the moil to a cushioned stop. By specifying at least a portion of the periphery of the resilient moil cushion to be unbonded, and by specifying that substantially all flow of the moil cushion is freely radially outwardly, applicant provides that adequate space is available into which the moil cushion can flow when compressed, thereby insuring optimum cushioning for the moil. Adequate flow space is important since a resilient member is unable to cushion effectively if it has too small a space available into which it can flow when compressed.

Another object of the present invention is to provide an improved impact tool having a resilient moil cushion which is subject to as little wear as possible, and thereby having a long life span. This object is at least partially achieved by some aspects of the present invention which specify that substantially all flow of the resilient moil cushion is freely radially outwardly. Thus, when compressed, the moil cushion is not forced tightly into contact with the nose bushing where it would be subject to wear and abrasion. A long life moil cushion is also achieved by other aspects of the present invention which specify a snug slip fit between the nose bushing and the nose cap, thereby preventing dragging or extruding the moil cushion therebetween when the nose bushing is forced downwardly and compresses the moil cushion.

Another object of the present invention is to provide a tough, collapse resistant, and thus long life, moil cushion by specifying it to have a maximum longitudinal thickness which is approximately equal to its maximum radial thickness.

A further oject of the present invention is to provide for quick and easy removal and replacement of the nose cap when it is necessary to assemble or disassemble the impact tool or to remove, replace or index the moil. In addition, the present invention seeks to achieve this object at as low a cost as possible while still optimizing the ruggedness and inherent resistance to damage of the present invention. To these ends, applicant specifies that the nose cap be secured to the casing by longitudinal mounting ears and by easily removed transverse mounting pins which are retained in place by simple mounting clips. By specifying the mounting ears to be flush with the casing, the mounting pins and clips to be located in recesses in the casing, and the nose cap to be frustum-like, applicant achieves the further object of providing an improved impact tool having as small an overall diameter as possible and having a tapered nose cap so that the impact tool can have access even to restricted spaces.

It is a further object of the present invention to provide improved means for transferring energy from the moil to the nose bushing while simultaneously permitting easy insertion, removal or indexing of the moil within the nose bushing. To this end, further aspects of the present invention specify a one-piece nose bushing which carries a split keeper ring having an impact shoulder which extends inwardly into a necked portion of the moil. The necked portion of the moil also forms an impact shoulder which collides with the keeper ring's impact shoulder when the moil moves past a predetermined position, thereby transferring energy from the moil to the nose bushing. Simple removal of the split keeper ring permits the moil to be inserted, removed or indexed within the nose bushing.

A further object of the present invention is to provide an adequately supported, long life nose bushing which in turn provides adequate support for the moil it carries, thereby preventing sidewise displacement and vibration of the moil during use. To this end, an approximately medial flange on the nose bushing is specified, in order to permit the upper end of the nose bushing to be specified as supported by the casing while the lower end is specified as supported by the nose cap. A snug slip fit between the nose cap and the nose bushing ensures prevention of any sidewise displacement of the lower end of the nose bushing and, of course, the moil.

Further objects of the present invention are to provide for indexing of the moil with respect to the casing of the impact tool while simultaneously maintaining adequate support of the moil within the nose bushing to insure long life for the nose bushing and the moil. To the end of providing indexing, applicant specifies portions of the moil and the nose bushing cavity to include indexing means, and the flange on the nose bushing to include slots which enage the mounting means for the nose cap. Thus, the moil can be indexed and prevented from rotating since rotational forces on the moil are transferred from the moil, to the nose bushing, to the mounting means for the nose cap and finally to the casing of the impact machine. As will be described subsequently, when the indexing means are in the form of matching polygons on the moil and the nose bushing cavity, the life of the nose bushing is extended since areas of contact are provided therebetween via the line of contact encountered with a cylindrical moil and nose bushing cavity.

It is a further object of the present invention to provide an improved impact tool which is of a relatively low cost and which utilizes a minimum of parts while being highly durable, and reliable.

Other objects of the present invention are to provide an improved impact machine which utilizes a one-piece, triple purpose nose bushing which not only retains and indexes the moil, but also transmits the energy therefrom when the moil exceeds its normal range of travel.

These and other objects, features, advantages and characteristics of the improved impact tool of the present invention will be apparent from the following more detailed description of the preferred embodiments thereof.

BRIEF DESCRIPTION OF THE DRAWINGS

FIG. 3 is a view similar to that shown in FIG. 2, showing the moil cushion in the impact tool in a compressed condition;

FIG. 4 is a transverse cross section of the impact tool illustrated in FIG. 2 taken substantially along line 4—4 thereof;

FIG. 5 is a transverse cross section of the impact tool illustrated in FIG. 2 taken substantially along line 5—5 thereof.

DESCRIPTION OF THE PREFERRED EMBODIMENTS

It should be understood that the improved impact tool of the present invention can be fabricated in any of a variety of sizes, depending upon the needs of the user. Thus, its size may range from a small model which may be handheld, to a large, heavy-duty model which must be carried and positioned by a piece of construction machinery such as a backhoe or a power shovel due to the weight of the impact tool and the magnitude of the forces involved. But it should be noted that the improved impact tool of the present invention is particularly adapted to be embodied in the latter sort of impact tool where the large forces and heavy weight of the moil make particularly valuable the various features of the present invention which are set out in detail herein.

It is also to be understood that the improved impact tool of the present invention is by no means novel in all of its parts, with the improvements of the present invention lying solely in the construction and arrangement of both the moil and the lower portions of the impact tool. As can be appreciated, these improvements can be incorporated in any of a wide variety of impact tools of the class which utilize an elongated casing within which a pneumatically, hydraulically or electrically actuated hammer or piston repeatedly strikes the top of the moil. Thus, the details of construction of these portions of the impact tool are here only briefly alluded to, and, by way of non-limiting example, applicant hereby expressly incorporates the details of construction for these portions of the above class of impact tools are set forth in my aforesaid U.S. Pat. No. 3,739,863, or U.S. Pat. No. 3,661,216, granted May 9, 1972 to Yamanaka or U.S. Pat. No. 3,003,773, granted Oct. 10, 1961 to Feuhrer.

Figure 1:
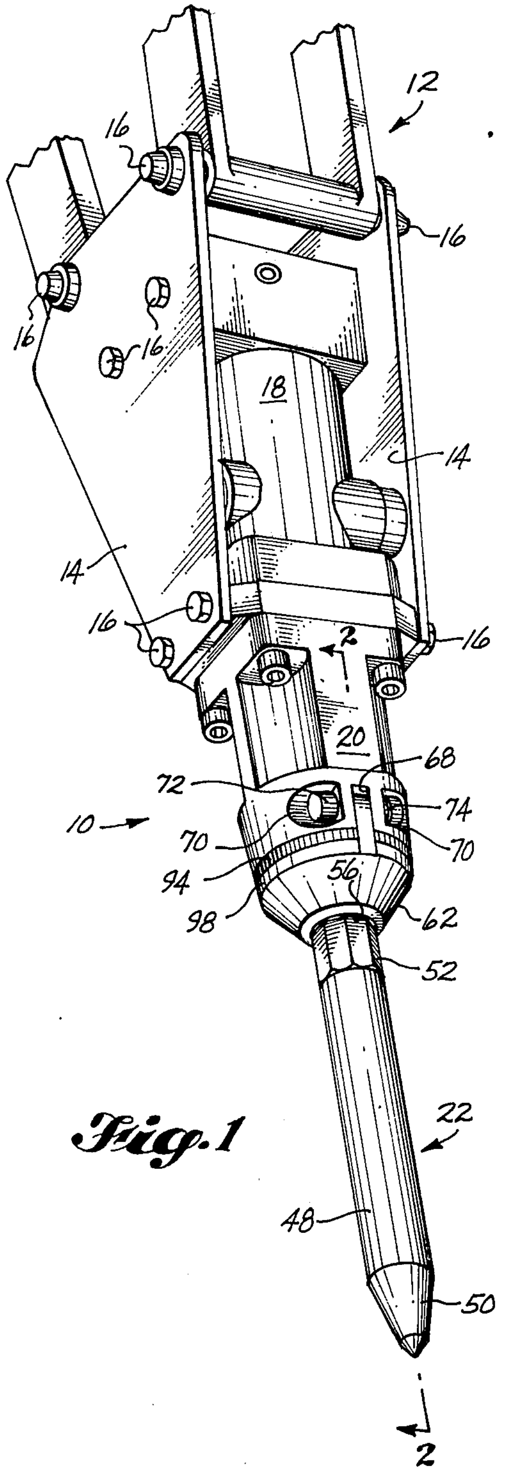
FIG. 1 is a perspective view from a lower aspect of the improved impact tool of the present invention shown attached to the end of a boom.

Referring now to FIG. 1, the improved impact tool of the present invention, generally designated at 10 is shown, by way of non-limiting example, mounted to the end of a backhoe or power shovel boom, generally designated at 12 by means of mounting brackets 14 and a plurality of bolts 16. The impact tool comprises upper and lower casing halves 18, 20 within which a pneumatically, hydraulically or electrically driven hammer or piston, not shown, repeatedly strikes the top of the moil 22 during use, causing the moil to reciprocate violently. It is to be understood that the boom 12, mounting brackets 14 and bolts 16 form no part of the present invention, and are shown only by way of illustration. In addition, the improved impact tool of the present invention could be sized and adapted to be mounted in many other ways, or even to be hand held.

Figure 2:
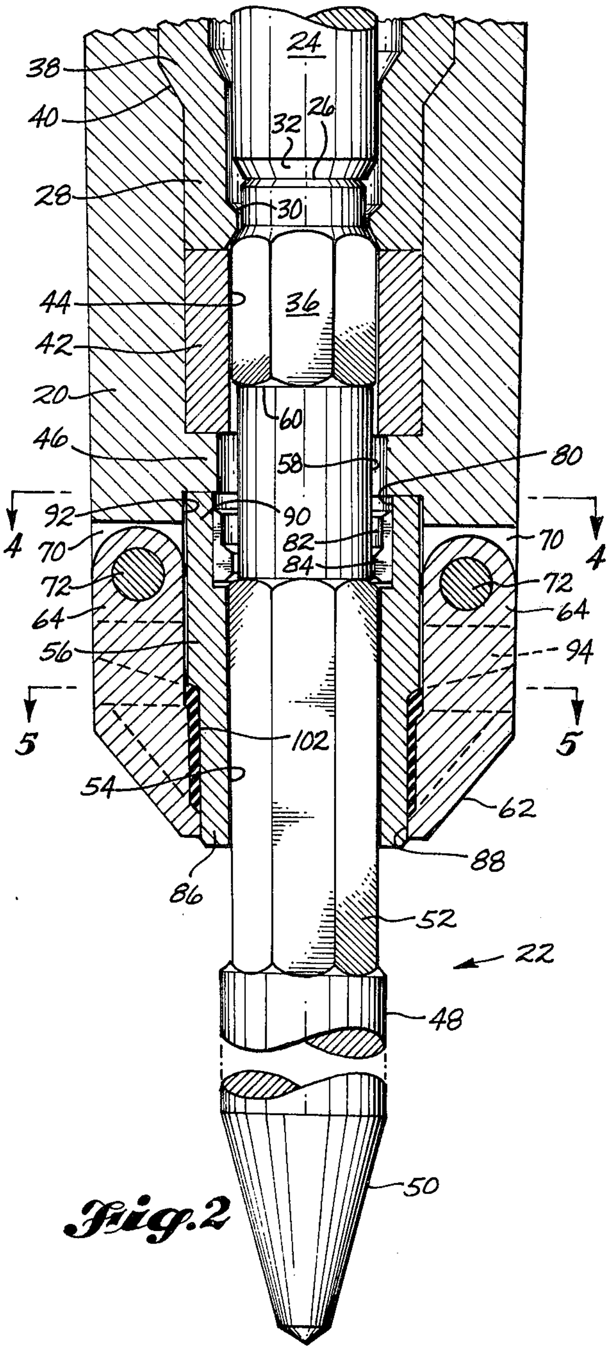
FIG. 2 is a longitudinal cross section of the impact tool illustrated in FIG. 1 taken substantially along line 2—2 thereof.
Figure 6:
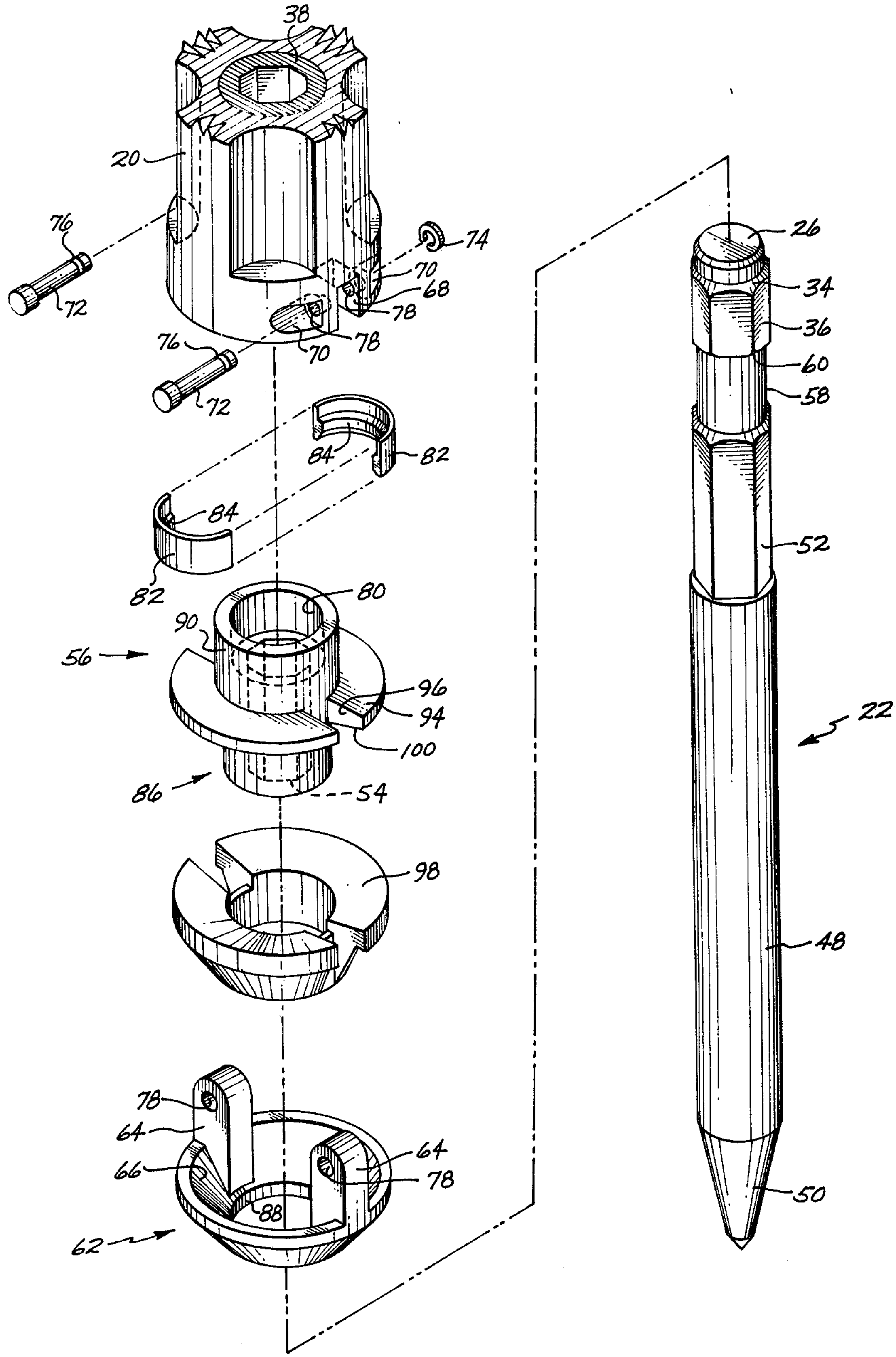
FIG. 6 is an exploded isometric of the impact tool of the present invention.

Referring now to FIGS. 2 and 6, which show the lower portion of the improved impact tool of the present invention, we see the lower casing 20 within which a pneumatically, hydraulically or electrically actuated hammer or piston 24 of conventional construction repeatedly strikes the top 26 of the moil during use. Concentric within the casing is a hammer bushing 28 which encircles the hammer 24 and centers it over the moil 22. The hammer bushing includes an inwardly projecting hammer bushing shoulder 30 which is of smaller diameter than the hammer and which engages the chamber 32 on the lower end of the hammer, as best seen in FIG. 3, to limit the range of downward travel of the hammer. As best seen in FIG. 2, the hammer bushing shoulder 30 also acts as a stop to limit the upward travel of the moil when the upper shoulder 34 on the octagonal upper portion 36 of the moil 22 strikes it from below. Cooperating structures, including tapers 38, 40 prevent the hammer bushing from relative movement with respect to the casings 18, 20.

Beneath the hammer bushing 28 and concentrically encircling the octagonal upper portion 36 of the moil is an upper moil bushing 42 defining a cylindrical cavity 44 which receives said octagonal upper portion of the moil, centers the moil beneath the hammer, and retains the moil against sidewise displacement. Of course, the cavity 44 could be octagonal to match the upper portion of the moil. The upper moil bushing 42 rests on an inwardly projecting rim 46 of the casing which both restrains the upper moil bushing from downward travel. The rim 46 also receives loads transmitted to it by the upper moil bushing 42 from the hammer bushing 28 when the hammer bushing is struck by the hammer.

It is understood that the material selected to be used in fabricating the upper and lower casings 18, 20, the hammer bushing 28, the hammer 24, the upper moil bushing 42 and the moil 22 are those conventionally used by those skilled in the art in constructing impact tools.

A significant part of applicant's present invention lies in the construction of his novel moil 22, which is best seen in FIG. 4. The lower portion 48 of the moil is of conventional construction, being of cylindrical cross-section and terminating in a pointed work tip 50. Of course, as is often the case, the moil may terminate in an enlarged or angularly disposed work tip of any of a variety of constructions, such as that shown in the aforesaid U.S. Pat. No. 1,470,622 granted to Jimmerson.

It should be noted that the octagonal cross section of the upper portion 46 of the moil serves no useful purpose per se, but is merely a result of the manufacture of the octagonal lower portion 52 of the moil, whose purpose will be explained subsequently in greater detail. Since one of the purposes of the upper portion 46 of the moil is to contact the upper moil bushing 42 to prevent tipping of the moil, it is apparent that the upper portion of the moil could be of cylindrical cross section to match the cylindrical cavity in the upper moil bushing which receives it. Of course, the diameter of such a cylindrical upper portion of the moil, not illustrated, must be sized such that it will pass, during removal or installation of the moil, through the octagonal cavity 54 of the nose bushing 56, which receives the octagonal lower portion 52 of the moil. Between the octagonal upper and lower portions 36, 52 of the moil lies an annular recess 58 which forms a necked portion of the moil and which forms a lower shoulder 60 on the octagonal upper portion 36 of the moil. The functioning of the moil in association with other parts of the improved impact tool of the present invention will be explained subsequently in greater detail.

Referring now to FIGS. 2 and 6, it is seen that the improved impact tool of the present invention includes a hollow nose cap 62 generally in the shape of a frustum. The tapered configuration of the nose cap is preferred to enable the impact tool to be used in tight situations where a nontapered nose cap might block access of the impact tool to the work piece, but it is within the scope of the present invention that a nontapered nose cap be used.

The nose cap includes a pair of mounting ears 64 which are secured to the internal surface 66 of the nose cap, as by welding. The lower portion of the lower casing 20 of the impact tool includes a pair of mounting slots 68 which receive the upper ends of their respective mounting ears. Associated with each mounting slot are a pair of mounting recesses 70 machined in the lower casing which receive the mounting pins 72 and the mounting pins associated mounting clips 74. The mounting clips are located in grooves 76 located at one end of the mounting pins. Each mounting ear 64 and one end of each mounting recess 70 includes a mounting pin aperture 78 which receives therethrough a transverse mounting pin 72 to hold the mounting ears and the outer casing of the impact tool in an assembled relation.

As best seen in FIG. 1, the purpose of the mounting recesses 70 are to provide mounting locations for the mounting pins and clips which are recessed below the external surface of the outer casing in order to minimize the possibility of damage to the mounting pins and clips, and to reduce the overall diameter of the impact tool for lower cost and to enable the impact tool to operate in tight places. Similarly, it is seen that the external surface of the mounting ears 64 are also substantially flush with the lower casing for like reasons. Of course, more than two mounting ears and associated mounting structures could be provided. The nose cap 62, mounting ears 64 and mounting pins 72 are made of strong, tough material such as high strength SAE 8620 steel which has been heat treated for surface hardness and internal toughness.

Mounting pins and clips are preferred over nut and bolt arrangements such as disclosed in U.S. Pat. No. 1,481,641, granted Jan. 22, 1924 to Jimmerson because they cost less, enable quick assembly or disassembly of the impact tool, and have a high resistance to damage during use from flying debris and the like since they lack threads. The mounting pins and clips, being recess mounted instead of externally mounted as in Jimmerson, are better protected from the possibility of damage and better enable applicant to reduce the overall diameter of his impact tool. Applicant's transverse mounting pins are preferred over longitudinal mounting nuts and bolts such as disclosed in U.S. Pat. No. 1,470,622, granted Oct. 16, 1923 to Jimmerson because the longitudinal mounting bolts of Jimmerson may be inherently more subject to failure because of the fact that they are subject to tensile forces rather than shear forces to which the transverse mounting pins of applicant are subjected.

The generally cylindrical nose bushing 56 includes an octagonal bore 54 which receives therethrough a portion of the octagonal lower portion 52 of the moil with a relatively snug slip fit. Lubricant is provided between both the upper moil bushing 42 and the octagonal upper portion 36 of the moil, and the octagonal bore 54 of the nose bushing and the octagonal lower portion of the moil.

The upper portion of the nose bushing includes a cylindrical keeper ring recess 80 in which is mounted a split keeper ring 82 having an inwardly projecting impact shoulder 84. As seen in FIG. 2, when the cushioned moil stop is in an assembled relation, the impact shoulder on the split keeper ring projects inwardly into the annular recess 58 on the moil. The keepr ring is fabricated from low carbon steel such as SAE 1018 and is somewhat ductile to conform to the shape of the lower shoulder 60 on the octagonal upper portion of the moil.

As best seen in FIG. 2, the cylindrical lower portion 86 of the nose bushing is prevented from sidewise displacement by its relatively snug slip fit with the circular aperture 88 in the nose cap through which is passes, and from which is projects at least slightly at all times. The cylindrical upper portion 90 of the nose bushing is received in a nose bushing recess 92 in the lower casing of the impact tool which serves to restrain the upper portion nose bushing from sidewise displacement during use.

As is seen in FIG. 3, even during maximum downward displacement of the nose bushing, the upper portion 90 of the nose bushing is at all times securely restrained by the nose bushing recess 92. Of course, by securely restraining both the upper and lower portions of the nose bushing from sidewise displacement, applicant achieves the objectives of increased resistance to vibration and wear, while also preventing any sidewise displacement of the moil itself during use.

The nose bushing also includes an outwardly extending nose bushing flange 94 which terminates substantially flush with the lower casing. The nose bushing flange includes a pair of mounting ear slots 96 through which the mounting ears 64 extend. The flange on the nose bushing gradually tapers in thickness having a maximum thickness closest to the moil and gradually tapering to a minimum thickness at its periphery. Such a construction maximizes the strength of the nose bushing flange over that which it would have if it were of constant thickness, and significantly increases its strength for weight characteristic over the conventional, uniform thickness nose bushing flange which is found in many prior art devices.

Referring again to FIGS. 2 and 6, it is seen that a moil cushion 98 in the form of a body of resilient material is located between the lower surface 100 of the nose bushing flange and the internal surface 66 of the nose cap. By way of nonlimiting example, applicant's moil cushion is fabricated from neoprene rubber having a durometer rating of 50 and a 2500 lb tensile strength, although as can be appreciated, a wide range of rubbers or other resilient materials could be used. A bonded connection is formed between the internal surface 66 of the nose cap, the moil cushion 98 and the lower surface 100 nose bushing flange by conventional vulcanizing techniques. In short, the nose bushing and the nose cap are held in the desired relation in a mold and mastic neoprene rubber is inserted to fill the space between the nose bushing flange and the internal surface of the nose cap. Then the mold is inserted into a conventional vulcanizing press where heat and pressure finish the vulcanizing process to form the moil cushion and adhere it to both the flange on the nose bushing and the inner surface of the nose cap. Adhesion of the rubber to the external surface 102 of the lower portion of the nose bushing is prevented, in the conventional fashion, by spraying that portion of the nose bushing with a silicone spray prior to appying the neoprene rubber to the mold.

It is preferred that the moil cushion be bonded, as by vulcanizing, to both the nose bushing flange and to the internal surface of the nose cap in order to prevent any creep or displacement of the moil cushion during use despite the severe vibrational forces encountered. Although the moil cushion contacts a portion of the external surface 102 of the lower portion of the nose bushing, it is not bonded thereto in order to enhance the ability of said external surface to slide with respect to the moil cushion. Although a lubricant between the moil cushion and said external surface of the lower portion of the nose bushing is not required, a lubricant can be applied in this region to reduce friction therebetween. It is noted that because of the relatively snug slip fit between said external surface 102 and the aperture 88 in the nose cap, there is no possibility that the moil cushion will intrude therebetween during use of the impact tool.

As best seen in FIG. 2, the outer periphery of the moil cushion is substantially flush with the lower casing of the impact tool. It should be noted however that the maximum diameter of both the flange on the nose bushing and the moil cushion can be smaller than the maximum diameter of the lower casing, without departing from the scope of the present invention. Similarly, the maximum diameters of the moil cushion and the nose bushing flange do not have to be the same.

It is noted that the periphery of the moil cushion is unbounded by both the flange 94 and the nose cap in order to provide unrestricted space into which the moil cushion can flow when compressed. If desired, a shield, not illustrated, would be secured to the nose cap and the lower casing, as by screws, to cover the outer peripheries of both the nose bushing flange and the moil cushion in order to prevent foreign matter from damaging the same, and to prevent intrusion of foreign matter into the impact tool in this region. But again, in any embodiment in which the periphery of the moil cushion is bounded or enclosed, adequate space must always be provided into which the moil cushion can flow freely radially outwardly when compressed.

At this point it may be convenient to note that, although it is not preferred, it would be possible to eliminate the split keeper ring 82 by utilizing in the present invention a split nose bushing, not illustrated. In such case, of course, the upper portion of the nose bushing would have to include an inwardly projecting shoulder which would extend into the annular recess in the moil when the impact tool was in an assembled relation. Additionally, the nose bushing flange could not be bonded to the moil cushion. Such a construction utilizing a split nose bushing is not preferred because of the increased cost in fabricating a split nose bushing, because a split nose bushing is considered to be structurally weaker and less vibration resistant, and because when the moil cushion is unbonded to the nose bushing flange, it may be subject to an increased tendency to creep or be displaced during use.

In order to assemble the improved impact tool of the present invention, the top 26 of the moil is first inserted through the octagonal bore 54 in the nose bushing until the lower shoulder 60 on the octagonal upper portion 36 of the moil extends above the top of the nose bushing a sufficient distance such that the split keeper ring 82 can be inserted into the keeper ring recess 80 in the top of the nose bushing. Naturally, the longitudinal length of the recessed portion 58 of the moil is sized to permit this assembly operation. Since the impact shoulder 84 of the keeper ring extends inwardly into the annular recess on the moil, as seen in FIG. 3, it prevents the moil from dropping out of the impact tool.

Next, the top of the moil is inserted into the lower casing 20 of the impact tool while the mounting ears 64 are inserted into their respective mounting slots 68 on the lower casing. To secure the mounting ears to the lower casing, the mounting pins 72 are inserted through the mounting pin apertures 78 in both the outer casing and the mounting ears, and are secured with the mounting clips 74.

Although the moil shown in the figures terminates in a work tip 50 of reduced diameter, it is frequently the case that the moil may include an angularly disposed work tip 50 or a work tip having a diameter greater than the balance of the moil, such as a wide chisel-like work tip. If such is the case, it becomes apparent that is is desirable that it be possible to index the moil with respect to the lower casing of the impact tool, in order to properly orient the work tip with respect to the impact machine. Of course, it is preferred that moils with such work tips have the capability of being indexed at several positions with respect to the impact tool in order to provide an orientation for the work tip that is most suitable for the particular task encountered.

Indexing of the moil of the present invention is provided by the octagonal lower portion 52 of the moil and the matching octagonal bore 54 in the nose bushing. Rotation of the moil is prevented by the nose bushing, whose mounting ear slots 96 engage the mounting ears 64 on the nose cap to prevent any rotation of the nose bushing and the moil it encircles.

It is apparent that since the lower portion 52 of the moil and the bore 54 in the nose bushing are octagonal, the moil can be oriented in four positions with respect to the impact tool. Of course, it is within the scope of the present invention that these elements need not be of octagonal configuration, but could instead be of other configuration depending upon the number of indexing positions needed. If only one indexing position is needed, these elements need not have a polygonal configuration, but could instead be circular with one flat side, for example.

In order to index the moil of the present invention, all that is needed is to remove the mounting clips 74 from the mounting pins 72, withdraw the mounting pins from the mounting pin apertures 78 and drop the moil, nose bushing, split keeper ring, moil cushion and nose cap a short distance from the lower casing. Then the split keeper ring is removed, which permits the moil to be dropped out of the nose bushing. Next, the moil is rotated to the desired indexing position, reinserted into the nose bushing and the impact tool is re-assembled as has been previously described.

An important feature of the present invention is that the octagonal nose bushing bore 54 also provides large areas of support for the octagonal lower portion 52 of the moil which it carries, instead of the single line of support which is provided in devices utilizing a nose bushing with a cylindrical bore and a moil with a corresponding cylindrical portion. This important feature greatly increases the life of both the nose bushing and the moil.

Now that a detailed description of the construction and assembly of the improved impact tool of the present invention has been given, applicant turns now to a consideration of its operation.

During normal operation of the impact tool, it is understood that the work tip 50 of the moil is applied to a work piece with some condiserable pressure due to the weight of the impact tool along with any downward force applied by the backhoe or other device which is carrying the impact tool. This force will cause the moil to move upwardly within the impact tool to the position shown in FIG. 2 where the upper shoulder 34 on the octagonal upper portion of the moil is in contact with the shoulder 30 on the hammer bushing and is prevented from further upward travel. Then the hammer 24 in the impact tool is forceably propelled downwardly by hydraulic, pneumatic or electric actuating means, until it strikes the top 26 of the moil. The force of the hammer is transmitted by the moil to the work piece, and in the process the moil may travel downwardly a short distance. However, as long as the work tip of the moil is supported by the work piece, the lower shoulder 60 on octagonal upper portion of the moil does not strike the impact shoulder 84 on the split keeper ring. After the force of the blow of the hammer on the moil has been dissipated, the down pressure of the impact tool and the rebound of the moil from the work piece help to return the moil to its initial position or adjacent thereto. Then, the cycle is repeated in rapid succession until the work piece is broken up to the desired extent. During this cycle it will be appreciated that the moil will oscillate longitudinally in such a manner that the impact shoulder 84 on the keeper ring is not struck due to the sizing of the annular recess 58 and the position of the split keeper ring.

However, in the previously described cycle, should the work piece break or move away from the moil, or should the impact tool be inadvertently actuated when the moil is not in contact with a work piece, after the hammer strikes the top of the moil the moil will continue its downward stroke until the lower shoulder 60 on octagonal upper portion of the moil contacts the impact shoulder 84 on the split keeper ring, forcing it downwardly, as seen in FIG. 3. As this occurs, the energy in the moving moil is transferred from the moil to the nose bushing by means of the split keeper ring. As the nose bushing is forced downwardly by the moil it compresses the moil cushion forcing it to flow freely radially outwardly and thereby dissipating the energy of the moil without damage to the impact tool. As seen in FIG. 3, at the maximum downward travel of the moil, the octagonal upper portion 36 of the moil always remains in contact with the upper moil bushing 42, thereby always providing proper support for the upper portion of the moil.

After the energy of the moil has been dissipated, the natural resilience of the moil cushion 98 returns the nose bushing to its initial position wherein the top surface of the flange is in contact with the lower casing. When the moil is reapplied to a work piece, the moil is forced upwardly until the upper shoulder 34 on the octagonal upper portion of the moil is in contact with the shoulder 30 on the hammer bushing, at which time the impact tool may be reactivated. Thus we have seen that the present invention utilizes a unique one-piece, triple function nose bushing which not only indexes and properly supports the moil but also helps to transfer energy from the moil to the moil cushion when the moil moves past a predetermined position.

From the foregoing, various further applications, modifications and adaptations of the apparatus disclosed by the foregoing preferred embodiments of the present invention will be apparent to those skilled in the art to which the present invention is addressed, within the scope of the following claims.

What is claimed is:

1. In a percussion tool of a type including a casing, an internal hammer, a protruding moil, means for driving the hammer to repeatedly strike the moil, and a cushioned moil stop, the improvement comprising:

longitudinally displaceable nose bushing means including an impact surface, an outwardly extending substantially radial flange terminating substantially flush with the exterior surfaces of the lower end of said casing, and an axial opening through which the moil extends.

a hollow nose cap adapted to be secured to the casing, one end of which defines an aperture which receives therethrough a portion of the nose bushing means, said nose cap including mounting means securing the nose cap to the casing of the percussion tool, the radially outermost parts of said nose cap terminating substantially flush with the exterior surface of the lower end of said casing;

a generally annular body of elastomeric material which surrounds the moil, is sandwiched between the nose cap and the flange and whose radially outermost parts terminate substantially flush with the exterior surface of the lower end of said casing; and an impact surface on the moil;

wherein when the moil moves past a predetermined position, the impact surface on the moil collides with the impact surface on the nose bushing means, to compress the resilient material between the nose cap and the flange on the nose bushing means, thereby causing substantially all of the flow of the resilient material to flow generally radially outwardly with respect to the nose bushing means and bringing the moil to a cushioned stop.

2. The percussion tool of claim 1, wherein the mounting means comprise at least two pairs of mounting lugs located on the casing of the percussion tool, at least two longitudinally extending mounting ears secured to the nose cap substantially flush with the casing, and at least two generally transverse mounting pins and mounting clips located in mounting recesses in the casing which hold the pairs of mounting lugs and the mounting ears in an assembled relation.

3. In a percussion tool of the type including a casing, an internal hammer, a protruding moil, means for driving the hammer to repeatedly strike the moil, and a cushioned moil stop, the improvement comprising:

the moil including a substantially annular reduced portion and an impact surface formed by one of the shoulders between the reduced portion of the moil and the adjacent portions of the moil;

longitudinally displaceable nose bushing means including a substantially annular split keeper ring having a portion which is of small diameter than are said adjacent portions of the moil, said smaller diameter portion of the keeper ring forming an impact surface for the nose bushing means and retaining the moil within the nose bushing, and wherein the nose bushing means includes a nose bushing having an outwardly extending, substantially radial flange, an axial opening through which the moil extends, and a substantially annular recess wich receives the keeper ring;

a hollow nose cap adapted to be secured to the casing, one end of which defines an aperature which receives therethrough a portion of the nose bushing means;

mounting means securing the nose cap to the casing of the percussion tool;

a generally annular body of elastomeric material surrounding the moil and sandwiched between the nose cap and the flange;

whereby when the moil moves past a predetermined position the impact surface of the moil collides with the impact surface of the nose bushing means, to compress the elastomeric material between the nose cap and the flange on the nose bushing means, thereby causing the elastomeric material to flow generally radially outwardly with respect to the nose bushing means and bringing the moil to a cushioned stop.

4. The percussion tool of claim 3, wherein the nose bushing means includes a nose bushing which includes said radial flange, wherein said nose bushing is substantially cylindrical with the flange spaced apart from the opposing ends thereof, with one of the opposing ends in contact with the inner surface of the casing and the other of the opposing ends in contact with the nose cap to prevent sidewise displacement of the moil during use.

5. The percussion tool of claim 3, wherein the nose bushing is one piece.

6. In a percussion tool of the type including a casing, an internal hammer, a protruding moil, means for driving the hammer to repeatly strike the moil, and a cushioned moil stop, the improvement comprising:

longitudinally displaceable nose bushing means encircling the moil, and including an impact surface and a substantially radial flange terminating substantially flush with the exterior surface of the lower end of said casing;

a nose cap which encircles the nose bushing means and from which a portion of the nose bush means projects, said nose cap including mounting means which secure the nose cap to the casing of the percussion tool, the radially outermost parts of the nose cap terminating substantially flush with the exterior surface of the lower and of the casing; and, a body of resilient material retained between the nose cap and a flange on the nose bushing means and whose radially outermost parts terminate substantially flush with the exterior surface of the lower end of said casing;

wherein the moil includes an annular necked portion and one of the shoulders between the necked portion of the moil and one of the adjacent portions of the moil forms an impact surface for the moil;

whereby when the moil exceeds a predetermined range of travel, the impact surfaces of the moil and of the nose bushing means collide, compressing the resilient material between the flange on the nose bushing means and the nose cap and causing the resilient material to flow generally outwardly with respect to the nose bushing means to bring the moil to a cushioned stop.

7. The percussion tool of claim 6, wherein the mounting means comprises at least two retaining aperatures located in the casing of the percussion tool, at least two corresponding longitudinally extending mounting ears secured to the nose cap, which are substantially flush with the casing, and at least two corresponding transverse mounting pins located in mounting recesses in the casing which pass through their respective mounting ears and mounting apertures to hold the outer casing of the percussion tool and the mounting ears in an assembled relation.

8. In a percussion tool of a type including a casing, an internal hammer, a protruding moil, means for driving the hammer to repeatedly strike the moil, and a cushioned moil stop the improvement comprising:

longitudinally displaceable nose bushing means including an impact surface, an outwardly extending substantially radial flange, and an axial opening through with the moil extends;

a hollow nose cap adapted to be secured to the casing, one end of which defines an aperature which received therethrough a portion of the nose bushing means;

mounting means securing the nose cap to the casing of the percussion tool;

a generally annular body of elastomeric material surrounding the moil and sandwiched between the nose cap and the flange; and an impact surface on the moil;

wherein at least one portion of the moil and at least one portion of the nose bushing cavity include indexing means for selectively maintaining the moil at any one of several predetermined angles with respect to the casing, and wherein the flange on the nose bushing means include slots which slidingly engage the mounting means to prevent rotation of the nose bushing means with respect to the casing during use;

whereby when the moil moves past a predetermined position, the impact surface on the moil collides with the impact surface on the nose bushing means, to compress the resilient material between the nose cap and the flange on the nose bushing means, thereby causing the resilient material to flow generally radially outwardly with respect to the nose bushing means and bringing the moil to a cushioned stop.

9. In a percussion tool of the type including a casing, and an internal hammer, a protruding moil, means for driving the hammer to repeatedly strike the moil and a cushioned moil stop, the improvement comprising:

the moil including an annular necked portion, wherein one of the shoulders between the necked portion of the moil and one of the adjacent portions of the moil forms an impact surface for the moil;

longintudially displaceable nose bushing means encircling the moil, including a substantially annular split keeper ring having a portion which is of small diameter are said adjacent portions of the moil, said smaller diameter portion of the keeper ring forming an impact surface for the nose bushing means and retaining the moil within the nose bushing means, and wherein the nose bushing means includes a nose bushing which includes a substantially radial flange, and a substantially annular recess which receives the keeper ring;

a nose cap which encircles the nose bushing means, and from which a portion of the nose bushing means projects;

mounting means which secure the nose cap to the outer casing of the percussion tool;

and a body of resilient material retained between the nose cap and the flange on the nose bushing means;

whereby when the moil excedes a predetermined range of travel, the impact surfaces of the moil and of the nose bushings means collide, compressing the resiliant material between the flange on the nose bushing and the nose cap and causing the resiliant material to flow generally outwardly with respect to the nose bushing means to bring the moil to a cushioned stop.

10. The percussion tool of claim 9, wherein the nose bushing is one piece.

11. In a percussion tool of the type including a casing, an internal hammer, a protruding moil, means for driving the hammer to repeatedly strike the moil, and a cushioned moil stop, the improvement comprising:

longitudially displaceable nose bushing means encircling the moil, and including an impact surface and a substantially radial flange;

a nose cap which encircles the nose bushing means, and from which a portion of the nose bushing means projects;

mounting means which secure the nose cap to the outer casing of the percussion tool; and a body of resilient material retained between the nose cap and the flange on the nose bushing means;

wherein the moil includes an annular necked portion and one of the shoulders between the necked portion of the moil and one of the adjacent portions of the moil forms and impacts surface for the moil;

wherein at least one portion of the moil and at least one portion of the nose bushing means include indexing means for selectively maintaining the moil at any one of several predetermined angles with respect to the casing, and wherein the flange on the nose bushing means include slots which slidingly engage the mounting means to prevent rotation of the nose bushing means with respect to the casing during use.

whereby when the moil exceeds a predtermined range of travel, the impact surfaces of the moil and of the nose bushing means collide, compressing the resilient material between the flange on the nose bushing means and the nose cap and causing the resilient material between the flange on the nose bushing means and the nose cap and causing the resilient material to flow generally outwardly with respect to the nose bushing means to bring the moil to a cushioned stop.

12. The percussion tool of claim 11, wherein the nose bushing means includes a nose bushing which includes said radial flange, wherein said nose bushing is substantially cylindrical with the flange spaced apart from the opposing ends thereof, with one of the opposing ends in contact with the inner surface of the casing and the other of the opposing ends in contact with the nose cap to prevent sidewise displacement of the percussion tool during use.

* * * * *